United States Patent [19]

Jaszka et al.

[11] 3,879,528
[45] Apr. 22, 1975

[54] CHLORINATED SULFAMIDES AND THEIR PREPARATION

[75] Inventors: Daniel J. Jaszka, Tonawanda, N.Y.; David Curtis, Ann Arbor, Mich.

[73] Assignee: Hooker Chemicals & Plastics Corporation, Niagara Falls, N.Y.

[22] Filed: Aug. 6, 1973

[21] Appl. No.: 385,781

[52] U.S. Cl. ............................... 423/386; 423/388
[51] Int. Cl. ..................... C01b 21/52; C01b 21/54
[58] Field of Search .......... 423/386, 388, 477, 387, 423/512

[56] References Cited
UNITED STATES PATENTS
2,459,124  1/1949  Booth ............................... 423/477

OTHER PUBLICATIONS
Mellor; A Comprehensive Treatise on Inorganic and Theoretical Chemistry, Vol. 8 (1928), p. 660–666.

*Primary Examiner*—Earl C. Thomas
*Attorney, Agent, or Firm*—Peter F. Casella; Donald C. Studley

[57] ABSTRACT

Chlorinated sulfamides are produced by reacting chlorine monoxide with sulfamide in a solvent system. The reaction is carried out at temperature ranges from about −20° to about 50°C at solution concentration ranges of $ClO_2$ from about 0.5 molar to about 5.0 molar. N,N'-dichlorosulfamide may be produced by this method.

4 Claims, No Drawings

CHLORINATED SULFAMIDES AND THEIR PREPARATION

The present invention relates to chlorinated sulfamides and to a novel method for their production. In particular the chlorinated sulfamides of the present invention are N-monochlorosulfamide and N,N'-dichlorosulfamide.

The compounds of the present invention have a high available chlorine content. Available chlorine content of a chloroamine is the amount of elemental chlorine that would be required in order to have the same oxidizing power. Thus, the compounds of the present invention are useful as antiseptics and disenfectants and as components in cleaning and sanitizing compositions.

In general chloroamines are prepared by the reaction of chlorine, or compounds having active chlorine, with amines. A number of such reactions are described in the ENCYCLOPEDIA OF CHEMICAL TECHNOLOGY, Kirk-Othmer, 2d Edition, Volume 4, pp 909–926. However, sulfamide is not chlorinated with hypochlorous acid or by t-butyl hypochlorite in methanol, nor by chlorine gas in an aqueous acid solution or by passing chlorine gas into molten sulfamide.

It has been found that sulfamide may be chlorinated using chlorine monoxide. The reaction is exothermic and difficult to control in that the chlorination easily proceeds past the formation of chloroamides, breaking the nitrogen bond, and forming nitrogen trichloride, an explosive material that is exceedingly dangerous except in low concentrations. It has now been found that the reaction may be controlled to produce substantially pure chlorinated sulfamide products without fracture of the nitrogen bond. The present reaction is carried out in a solvent system. Suitable solvents are those that are non-reactive with either sulfamide or chlorine monoxide. Carbon tetrachloride and chloroform are examples of suitable solvents. Either the sulfamide component or the chlorine monoxide component may initially be dissolved in the solvent and the other component subsequently added. Preferably the chlorine monoxide and sulfamide are initially dissolved in separate parts of solvent and the parts mixed. The reaction may be carried out at temperatures between about −20° to about 50°C, however, because of the volatility of the reaction the temperature is preferably maintained between about 25° and about 0°C. The concentration of chlorine monoxide may vary between about 0.5 and about 5 molar, however, again because of the nature of the reaction, it is preferred to utilize a range of between about 0.5 and about 1 molar.

In a preferred embodiment of the invention a solution of chlorine monoxide is prepared in a suitable solvent, and added to a solution of sulfamide in the same solvent at a temperature from about 0° to about 25°C for a time sufficient for the reaction to take place. After the reaction is complete, as evidenced by the disappearance of the red color of chlorine monoxide, the product is isolated by conventional means, such as, distillation or crystallization.

The following examples are illustrative of the present invention and are not to be considered limiting:

EXAMPLE I 5.0 grams of sulfamide, $SO_2(NH_2)_2$, were suspended in carbon tetrachloride at 0°C and then treated with 4.5 grams of chlorine monoxide, $Cl_2O$, in 92 milliliters of carbon tetrachloride. The suspension was stirred until the red color of chlorine monoxide was no longer evident. The reaction product was collected by filtration and extracted with chloroform to give white crystals of monochlorosulfamide, $(H_2N)SO_2(NHCl)$ which has a m.p. of 65°–66°C.

EXAMPLE II 5.0 grams of sulfamide were treated as described in Example I with 9 grams of chlorine monoxide dissolved in 185 ml of carbon tetrachloride. A white product was recovered and purified by extraction with chloroform containing a few milliliters of chlorine monoxide. The pure product, as determined by its melting point of 80°C, is dichlorosulfamide, $SO_2(NHCl)_2$.

What is claimed is:

1. N,N' dichlorosulfamide.
2. A process for the production of chlorinated sulfamides comprising the steps of reacting sulfamide with chlorine monoxide at a temperature range of from about −20° to about 50°C in a solvent system and recovering a chlorinated sulfamide.
3. The process of claim 2 wherein the recovered chlorinated sulfamide is monochlorosulfamide.
4. The process of claim 2 wherein the recovered chlorinated sulfamide is dichlorosulfamide.

* * * * *